United States Patent
Lee et al.

(10) Patent No.: US 9,794,633 B2
(45) Date of Patent: Oct. 17, 2017

(54) IMAGE DEVICE, RECEIVING METHOD OF CONTENTS, SERVER AND PROVIDING METHOD OF CONTENTS

(75) Inventors: Sang-kwon Lee, Suwon-si (KR); Se-jun Han, Daejeon (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 518 days.

(21) Appl. No.: 13/169,463

(22) Filed: Jun. 27, 2011

(65) Prior Publication Data
US 2011/0321081 A1    Dec. 29, 2011

(30) Foreign Application Priority Data

Jun. 28, 2010  (KR) .................. 10-2010-0061488
Sep. 15, 2010  (KR) .................. 10-2010-0090379

(51) Int. Cl.
*G06F 15/16*    (2006.01)
*H04N 21/475*   (2011.01)
(Continued)

(52) U.S. Cl.
CPC ..... *H04N 21/4753* (2013.01); *H04N 21/4786* (2013.01); *H04N 21/4788* (2013.01); *H04N 21/485* (2013.01)

(58) Field of Classification Search
CPC .... H04N 21/47; H04N 21/53; H04N 21/4786; H04N 21/4788; H04N 21/485
(Continued)

(56) References Cited

U.S. PATENT DOCUMENTS

2002/0054087 A1*  5/2002  Noll .................. G06Q 30/02
                                                          715/744
2005/0102397 A1   5/2005  Tsuyama et al.
(Continued)

FOREIGN PATENT DOCUMENTS

CN    1533531 A    9/2004
CN    1852150 A    10/2006
(Continued)

OTHER PUBLICATIONS

Communication dated Mar. 19, 2015, issued by the State Intellectual Property Office of P.R. China in counterpart Chinese Application No. 201110185100.2.
(Continued)

*Primary Examiner* — Joseph E Avellino
*Assistant Examiner* — Marshall McLeod
(74) *Attorney, Agent, or Firm* — Sughrue Mion, PLLC

(57) ABSTRACT

An image device, a receiving method of contents, a server, and a providing method of contents are provided. The image device includes: a communication unit which communicates with a server that provides content received from a content provider; a display unit; at least one application execution unit which executes the content; and an application controller which controls the communication unit to receive the content corresponding to a log-in user from the server and displays, on the display unit, reception information indicating reception of the content based on a user ID for the log-in user to be logged in to the image device and a token which matches the user ID to a content ID for the log-in user to be connected to the content provider.

42 Claims, 17 Drawing Sheets

(51) Int. Cl.
*H04N 21/4786* (2011.01)
*H04N 21/4788* (2011.01)
*H04N 21/485* (2011.01)

(58) Field of Classification Search
USPC .................. 709/201, 204, 206, 217, 227
See application file for complete search history.

(56) References Cited

U.S. PATENT DOCUMENTS

| | | | |
|---|---|---|---|
| 2007/0169144 A1* | 7/2007 | Chen ................. | H04N 7/17318 725/30 |
| 2009/0182670 A1* | 7/2009 | Farrugia ............... | H04N 7/165 705/51 |
| 2009/0228566 A1 | 9/2009 | Sharp et al. | |
| 2009/0276840 A1 | 11/2009 | Cao et al. | |
| 2010/0005006 A1* | 1/2010 | Green et al. ............. | 705/26 |
| 2010/0023980 A1 | 1/2010 | Yamagishi et al. | |
| 2010/0205261 A1* | 8/2010 | Michel ............... | H04N 7/17318 709/206 |

FOREIGN PATENT DOCUMENTS

| | | |
|---|---|---|
| CN | 101572603 A | 11/2009 |
| KR | 1020090003970 A | 1/2009 |
| KR | 1020090072428 A | 7/2009 |
| KR | 1020090114818 A | 11/2009 |
| KR | 1020090128730 A | 12/2009 |

OTHER PUBLICATIONS

Communication dated Dec. 7, 2015 by The State Intellectual Property Office of PR China in related Application No. 201110185100.2.
Communication dated Feb. 18, 2016 by the European Patent Office in related Application No. 11169056.6.
Communication dated May 10, 2016, issued by the Korean Intellectual Property Office in counterpart Korean Application No. 10-2010-0090379.
Communication dated Nov. 21, 2016 issued by the Korean Intellectual Property Office in counterpart Korean Patent Application No. 10-2010-0090379.
Communication, dated Apr. 19, 2012, issued by the European Patent Office in corresponding European Application No. 11169056.6.

* cited by examiner

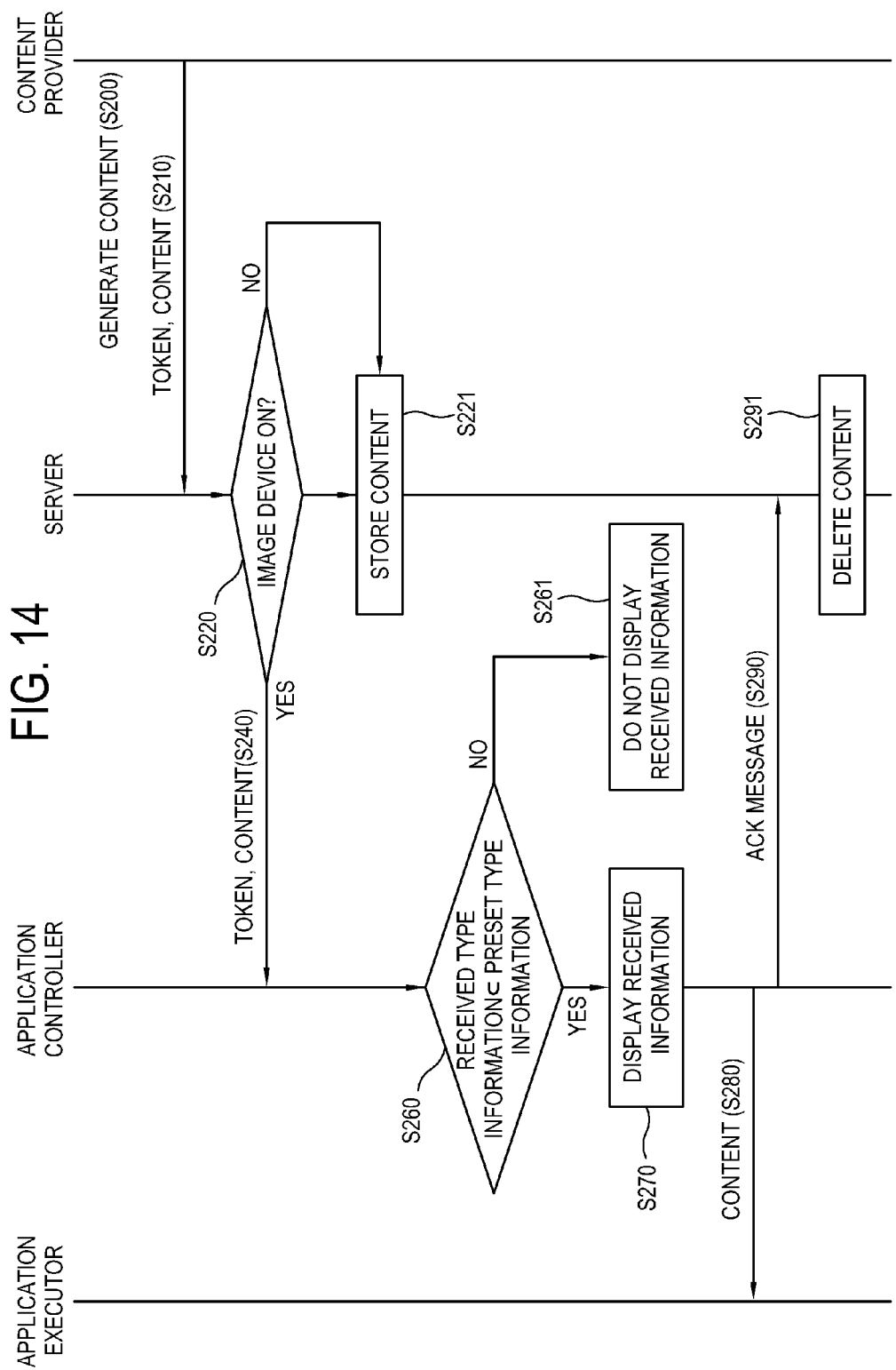

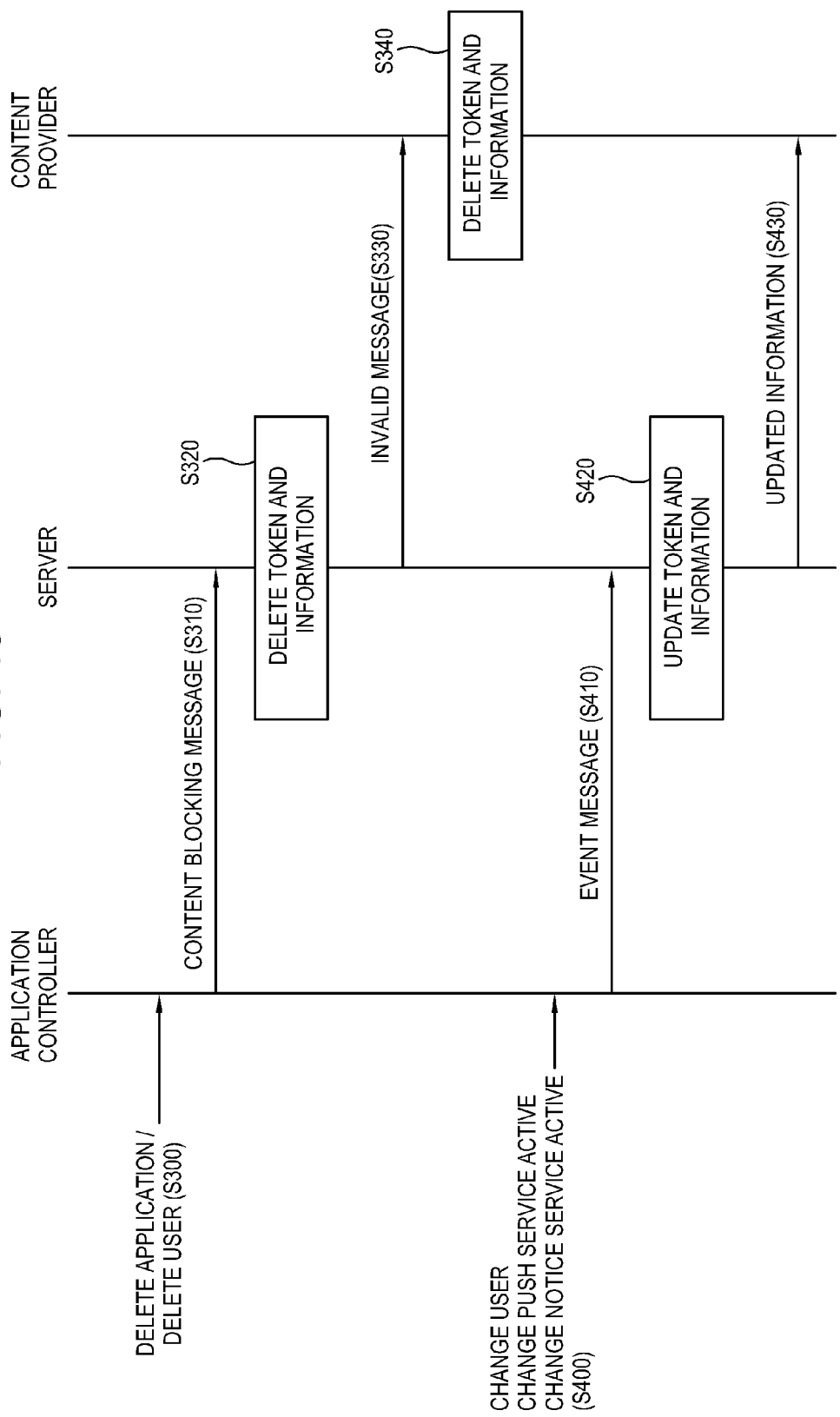

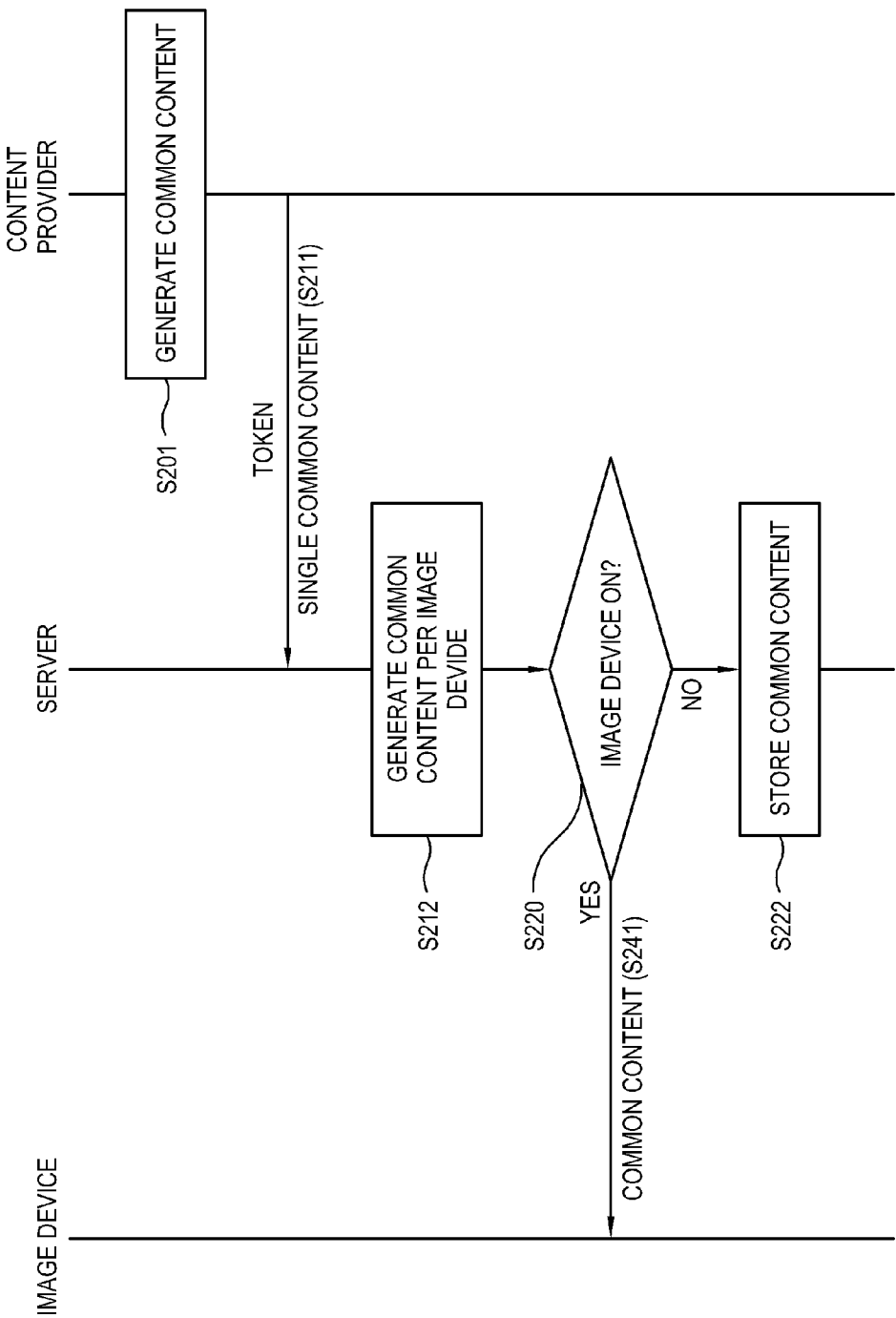

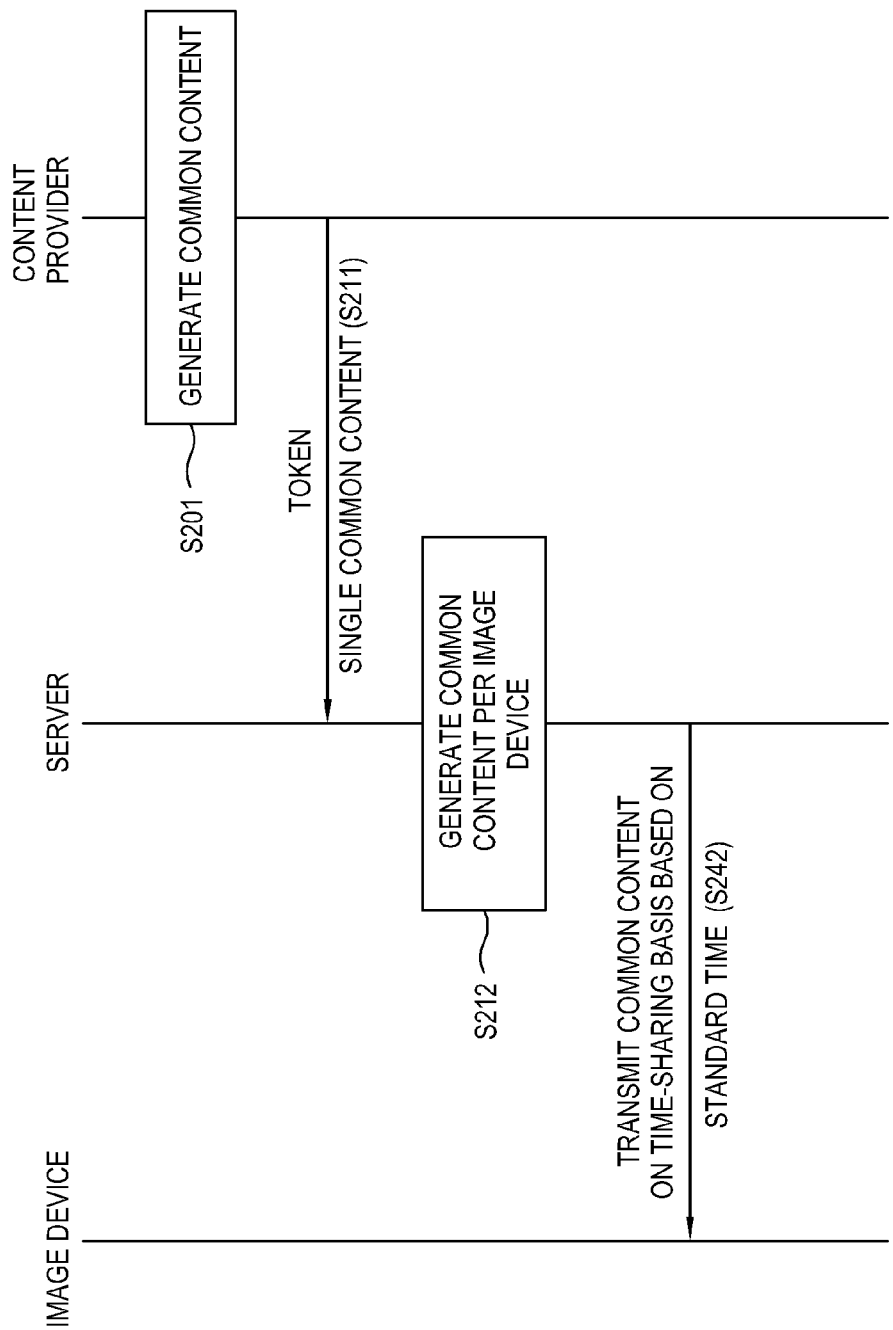

IMAGE DEVICE, RECEIVING METHOD OF CONTENTS, SERVER AND PROVIDING METHOD OF CONTENTS

CROSS-REFERENCE TO RELATED APPLICATIONS

This application claims priorities from Korean Patent Application No. 10-2010-0061488, filed on Jun. 28, 2010 in the Korean Intellectual Property Office, and Korean Patent Application No. 10-2010-0090379, filed on Sep. 15, 2010 in the Korean Intellectual Property Office, the disclosures of which are incorporated herein by reference in their entireties.

BACKGROUND

Field

Apparatuses and methods consistent with exemplary embodiments relate to an image device, a receiving method of contents, a server, and a providing method of contents, and more particularly, to an image device, a receiving method of contents, a server and a providing method of contents to which multiple users access.

Description of the Related Art

Televisions, which once displayed only a broadcasting signal, have been developed to now provide an Internet service and to execute various Web-based applications. With the development of various communication technologies, contents are transmitted and received more freely without being affected by the environment.

According to the development of Web-based social network services (SNS), one-person media is prospering and information sharing is conducted actively on the Web. Such SNS enables users to contact each other via e-mail or instant messenger services and enables users to upload various contents.

To meet various needs of users according to the development of contents and electronic devices, a proper service for providing contents is needed.

SUMMARY

Accordingly, one or more exemplary embodiments provide an image device, a receiving method of contents, a server and a providing method of contents which provide a push service to multiple users.

Furthermore, one or more exemplary embodiments provide an image device, a receiving method of contents, a server and a providing method of contents which provide a differential service for each user.

According to an aspect of an exemplary embodiment, there is provided an image device including: a communication unit which communicates with a server that provides content received from a content provider; a display unit; at least one application executor which executes the content; and an application controller which controls the communication unit to receive the content corresponding to a log-in user from the server and displays on the display unit reception information indicating reception of the content based on a user identifier (ID) for a the log-in user to be logged in to the image device and a token which matches the user ID to a content ID for the log-in user to be connected to the content provider.

The application controller may determine whether a push service for receiving the content from the content provider through the server is set as active and whether an application in which a notice service is set as active to display the reception information of the content exists, and may connect to the server if it is determined that the push service is set as active and the application in which the notice service is set as active exists.

The application controller may determine whether the token corresponding to the log-in user exists after the user's log-in, and may request the server to generate the token if it is determined that the token does not exist.

The application controller may transmit, to the server, image device information including the image device ID, the user ID and application information when requesting the server to generate the token.

The application controller may transmit, to the server, image device information including the image device ID, a common user ID and application information when requesting the server to generate the token if an application is not user-bound to the log-in user.

The application controller may store the token received from the server, and may control the application executor to transmit the token to the content provider.

The application controller may determine whether a user corresponding to the token is a current log-in user of the image device upon receiving the token and the content from the server, and may display the reception information if it is determined that the user corresponding to the token is the current log-in user.

The content may include type information of a type of displaying the reception information, and the application controller may display the reception information if the received type information is determined to correspond to preset type information.

The reception information may be displayed as at least one of a text, an icon, and a number indicating a number of received contents.

The application controller may control the application executor to execute the content and may transmit an acknowledge message informing the reception of the content to the server if the log-in user selects the execution of the content corresponding to the displayed reception information.

The application controller may determine whether a received token corresponds to a stored token if the server transmits the token and the content, and may transmit a content blocking message to the server if it is determined that the received token does not correspond to the stored token.

The application controller may transmit an event message to the server if a change of a log-in user, a change of a push service, a change of a notice service, a deletion of the token, or a deletion of the application occurs.

According to an aspect of another exemplary embodiment, there is provided a server including: a device communication unit which communicates with an image device; a provider communication unit which communicates with a content provider providing content; and a controller which generates a token corresponding to a user of the image device and controls the device communication unit to transmit the generated token to the image device in response to receiving a request to generate the token to match a user ID for logging in to the image device by the user and a content ID of the user ID and the user to be connected to the content provider.

The device communication unit may receive, from the image device, image device information including an image device ID, a user ID of a current log-in user of the image device, and application information, and the controller may determine whether a user corresponding to a received token is the current log-in user of the image device in response to receiving the token and content corresponding to the received token through the provider communication unit, and may transmit the received token and the content to the image device if it is determined that the user corresponding to the token is the current log-in user, and stores the received content if it is determined that the user corresponding to the token is not the current log-in user.

The controller may delete the image device information, the user ID, and the application information corresponding to the received token, and may transmit, to the content provider, an invalidity notice message informing an invalidity of the received token in response to receiving a content blocking message from the image device.

The controller may update at least one of the image device information, the user ID and the application information and transmits the updated information to the content provider in response to receiving from the image device an event message indicating at least one of a change of a log-in user, a change of a push service receiving the content from the content provider, a change of a notice service displaying reception information of the content, a deletion of the token and a deletion of an application.

According to an aspect of another exemplary embodiment, there is provided a providing method of content by a server which communicates with an image device and a content provider providing the content, the providing method including: receiving a request to generate a token that matches a user ID, for a user to log in to the image device, to a content ID for the user ID of the user to be connected to the content provider; and generating the token corresponding to the user and transmitting the generated token to the image device.

According to an aspect of another exemplary embodiment, there is provided a receiving method of content by an image device which communicates with a server providing the content received from a content provider, the receiving method including: determining whether a token which matches a user ID corresponding to a log-in user of the image device to a content ID for the log-in user to be connected to the content provider exists; requesting the server to generate the token if it is determined that the token does not exist; and receiving content corresponding to the token from the server if it is determined that the token exists.

According to an aspect of another exemplary embodiment, there is provided a server including: a device communication unit which communicates with a plurality of image devices; a provider communication unit which communicates with a content provider providing content; and a controller which determines whether an image device of a user, among the plurality of image devices, that receives the content of the content provider is currently connected in response to receiving new content from the content provider, and controls the device communication unit to transmit the content to the image device if it is determined that the image device of the user who receives the content is connected.

According to an aspect of another exemplary embodiment, there is provided a providing method of content, the providing method including: receiving, by a server, new content from a content provider; determining whether an image device of a user who receives content from the content provider is connected to the server; and transmitting, by the server, the new content to the image device if it is determined that the image device of the user who receives the content is connected to the server.

According to an aspect of another exemplary embodiment, there is provided a providing method of content by a server which communicates with an image device and a content provider providing the content, the providing method including: receiving, from the image device, image device information comprising a user ID of a user who is currently logged-in to the image device; receiving, from the content provider, a token and content corresponding to the token, the token matching a user ID of a user of the image device to a content ID of the content; determining whether a user corresponding to the received token is the currently logged-in user of the image device; transmitting the received token and the received content to the image device if it is determined that the user corresponding to the token is the currently logged-in user; and storing the received content if it is determined that the user corresponding to the token is not the currently log-in user.

BRIEF DESCRIPTION OF THE DRAWINGS

The above and/or other aspects will become apparent and more readily appreciated from the following description of exemplary embodiments, taken in conjunction with the accompanying drawings, in which:

FIG. 14 is a control flowchart of a process of receiving content and displaying reception information by an image device and a server according to another exemplary embodiment;

FIG. 15 is a control flowchart of a process of managing a token by an image device and a server according to an exemplary embodiment;

FIG. 16 is a control flowchart of a method of transmitting common content by an image device and a server according to an exemplary embodiment; and FIG. 17 is a control flowchart of a method of transmitting common content by an image device and a server according to another exemplary embodiment.

DETAILED DESCRIPTION OF EXEMPLARY EMBODIMENTS

Figure 1:
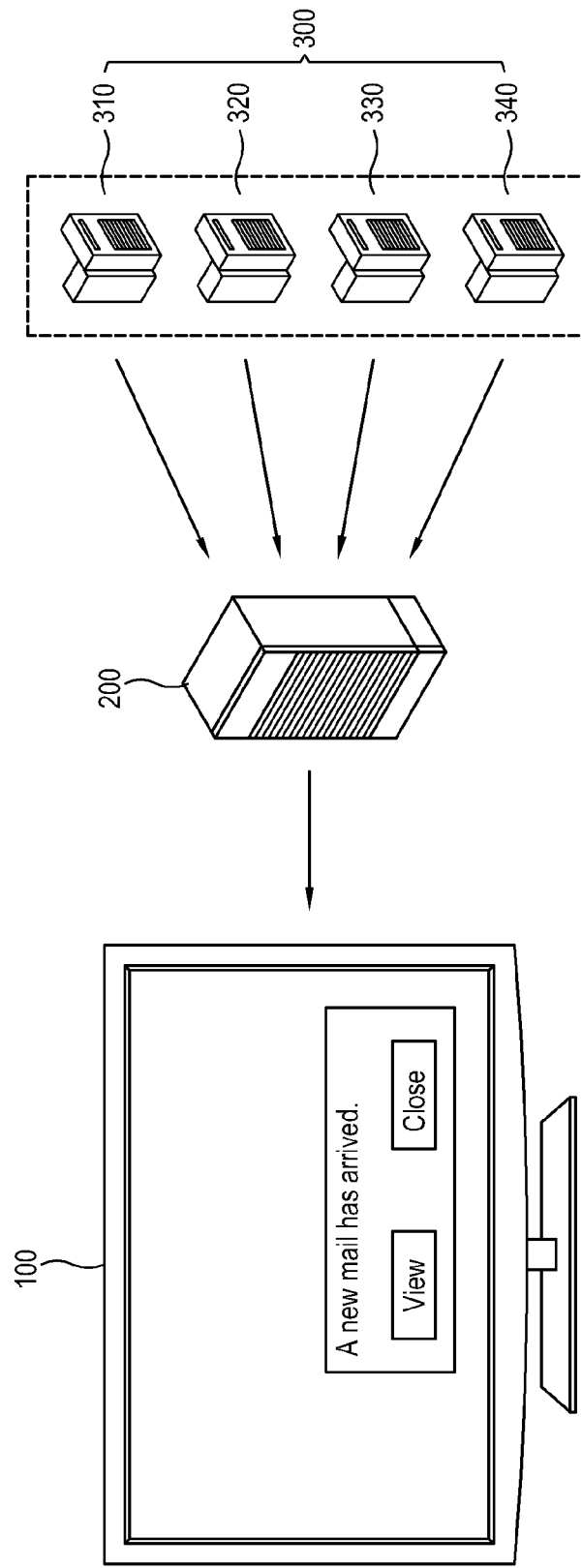
FIG. 1 illustrates an image device, a server and a content provider according to an exemplary embodiment.

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout. Expressions such as "at least one of," when preceding a list of elements, modify the entire list of elements and do not modify the individual elements of the list.

Figure 2:
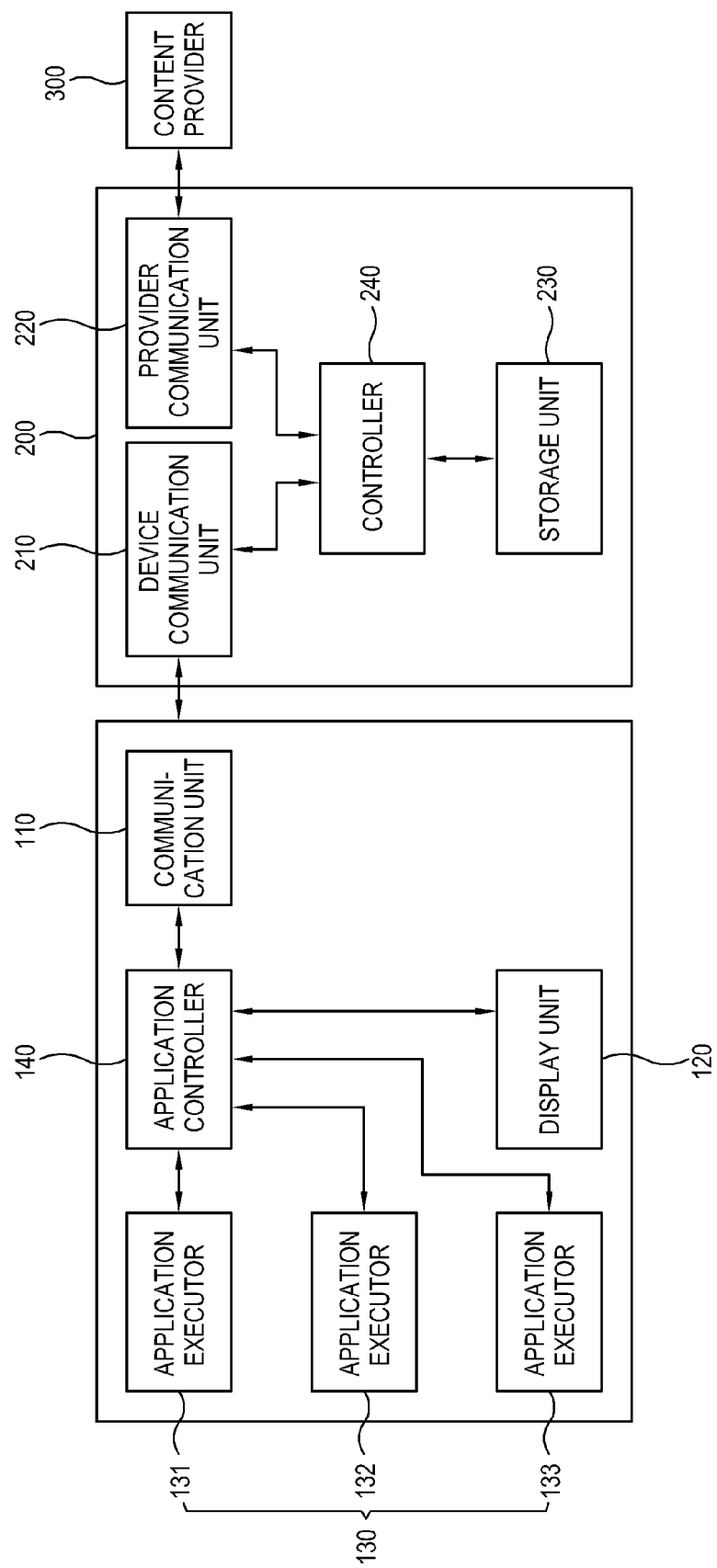
FIG. 2 is a control block diagram of an image device, a server and a content provider according to an exemplary embodiment.

FIG. 1 illustrates an image device 100, a server 200, and a plurality of content providers according to an exemplary embodiment. FIG. 2 is a control block diagram of an image device 100, a server 200 and a content provider 300 according to an exemplary embodiment. Referring to FIGS. 1 and 2, the server 200 communicates with an image device 100 and a plurality of content providers 310, 320, 330, and 340 (collectively, 300) in a network. The image device 100, the server 200 and the plurality content providers 300 transmit and receive contents and various signals. Communication between the server 200 and the image device 100 and communication between the server 200 and the content providers 300 may include any wired and wireless communication, e.g., communication through the Internet Web.

The content provider 300 is a content service provider. The content provider 300 may include a broadcasting station and other various service websites existing on the Web. For example, the content provider 300 may include any or all websites that provide contents to a user such as portal sites or a social network service (SNS), including FACEBOOK, MYSPACE, TWITTER, FLICKR, and YOUTUBE to which a user may be connected through a log-in process of inputting a particular ID and a password, a mailing service site, media sites on the Internet, etc.

The server 200 provides the image device 100 a push service which transmits to the image device 100 a content received from the content provider 300 through a communication between the image device 100 and the content provider 300. As shown in FIG. 2, the server 200 includes a device communication unit 210 which communicates with the image device 100, a provider communication unit 220 which communicates with the content provider 300, and a controller 240 which controls the foregoing elements to transmit and receive content. The server 200 may further include a storage unit 230 to store therein various ID information received from the image device 100 and contents transmitted by the content provider 300.

In the present exemplary embodiment, the image device 100 may include an Internet Protocol (IP) TV that allows access by multiple users and receives one or more Internet services. The image device 100 may include a computer system, a notebook computer, or any audio/video device including a display unit such as a monitor or a screen. For example, the image device 100 may further include a netbook, various mobile terminals, an e-book, etc. The image device 100 receives and displays content received from the content provider 300 through the server 200. A plurality of users may individually perform a log-in process to be connected to the image device 100. At least one of an authority to be connected to the image device 100, a viewable content, and broadcasting may vary depending on users.

The content is any information that the image device 100 may receive from the content provider 300. The content includes image information that may be displayed on the display unit 120 and audio information that may be output by an audio output unit (not shown). For example, the content includes a downloadable application, e.g., widget, to receive a particular service. A user may download the application through the content provider 300 or other external servers.

The image device 100 includes a communication unit 110 which communicates with the server 200, the display unit 120, a plurality of application executors 131, 132 and 133 (collectively, 130), and an application controller 140 which controls the application executor 130. The image device 100 may further include a storage unit (not shown) which stores therein various data, IDs and contents, and a user input unit (not shown) which receives a user's input.

According to a control of the application controller 140, the communication unit 110 transmits to the server 200 image device information of the image device 100 and token information (to be described later), and receives token information and contents from the server 200.

The display unit 120 may include a liquid crystal display (LCD) panel including a liquid crystal layer, an organic light emitting display (OLED) panel including an organic light emitting layer, a plasma display panel (PDP), etc. Furthermore, the display unit 120 may include a panel driver to drive the panel. The display unit 120 may display thereon at least one of various applications and contents, push service active/inactive information, content reception information, etc. If the user input unit includes a touch panel, the touch panel may be incorporated into the display unit 120, such that a user may control contents by touching the display unit 120.

The application executor 130, i.e., application execution unit, includes a driver to execute an application, and executes and provides to a user content received from the content provider 300. For example, if a particular content provider 300 transmits an email to a user, the application executor 130 may process the email for a user to confirm. If an SNS site transmits a new article, the application executor 130 may enable a user to post a comment. The image device 100 may include at least one application executor 130. The application executor 130 may be displayed as a plurality of icons on the display unit 120 so that a user may select or execute an application by browsing the applications represented by the icons.

The application controller 130 performs an overall control operation such as controlling a generation, transmission and deletion of a token for the push service, displaying on the display unit 120 reception information on whether a content is received, and executing content according to a user's selection. Hereinafter, a method of transmitting and receiving content according to a control of the application controller 140 and the controller 240 of the server 200 will be described in detail.

Figure 3:
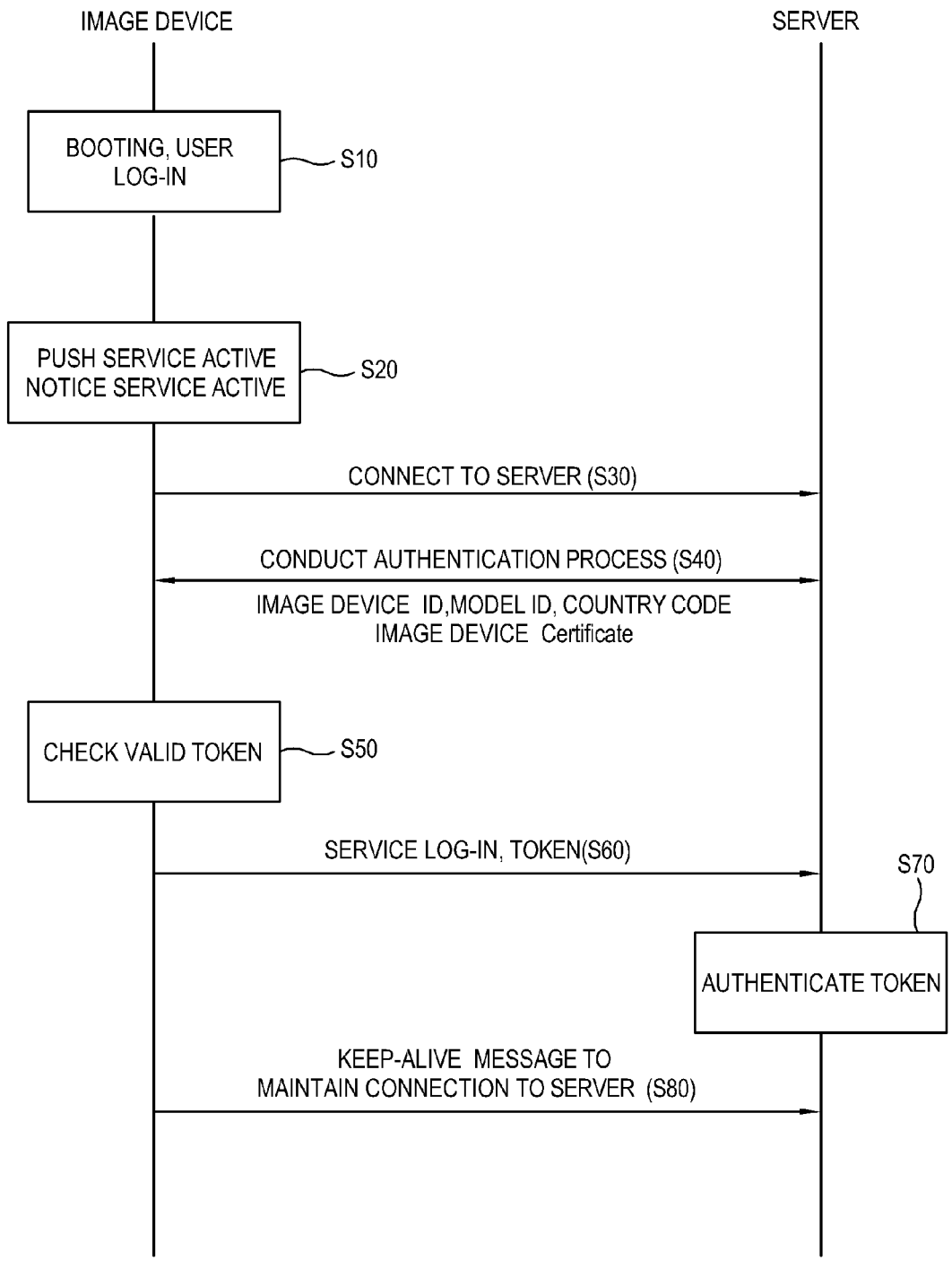
FIG. 3 is a control flowchart of processes of connecting and authenticating an image device and a server according to an exemplary embodiment.

FIG. 3 is a control flowchart of processes of connecting and authenticating an image device 100 and a server 200 according to an exemplary embodiment. In the present exemplary embodiment, the image device 100 accesses the server 200 and is connected to the server 200 through an authentication process.

Referring to FIG. 3, a user turns on and boots the image device 100, and logs in to the image device 100 through an ID authentication process, in which an ID is designated on an individual basis (operation S10). Hereinafter, the ID that is used by a user to be connected to the image device 100 will be referred to as a user ID. A user may individually set a user ID through a remote controller and a graphic user interface (GUI) provided to set the user ID, or may change or delete the user ID or a password. Moreover, the image device 100 may be booted without a log-in by a particular user.

Figure 4:
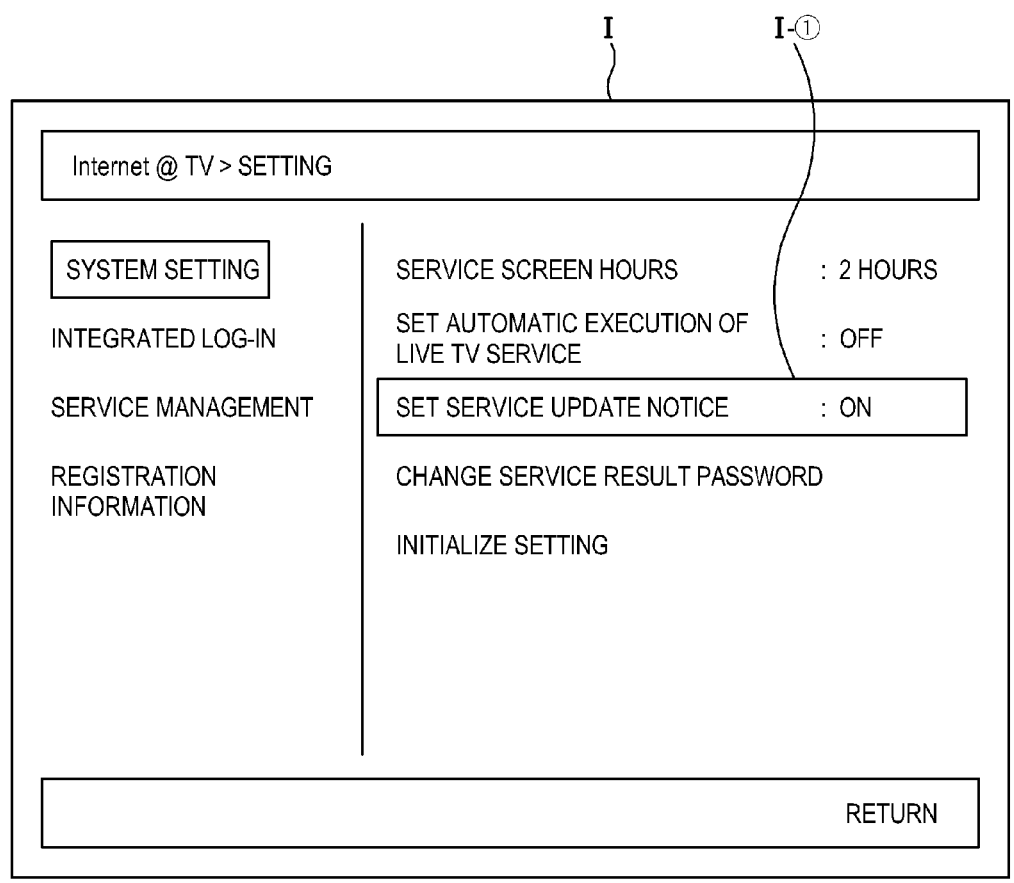
FIG. 4 illustrates a user interface (UI) that is displayed on an image device to set a push service according to an exemplary embodiment.
Figure 5:
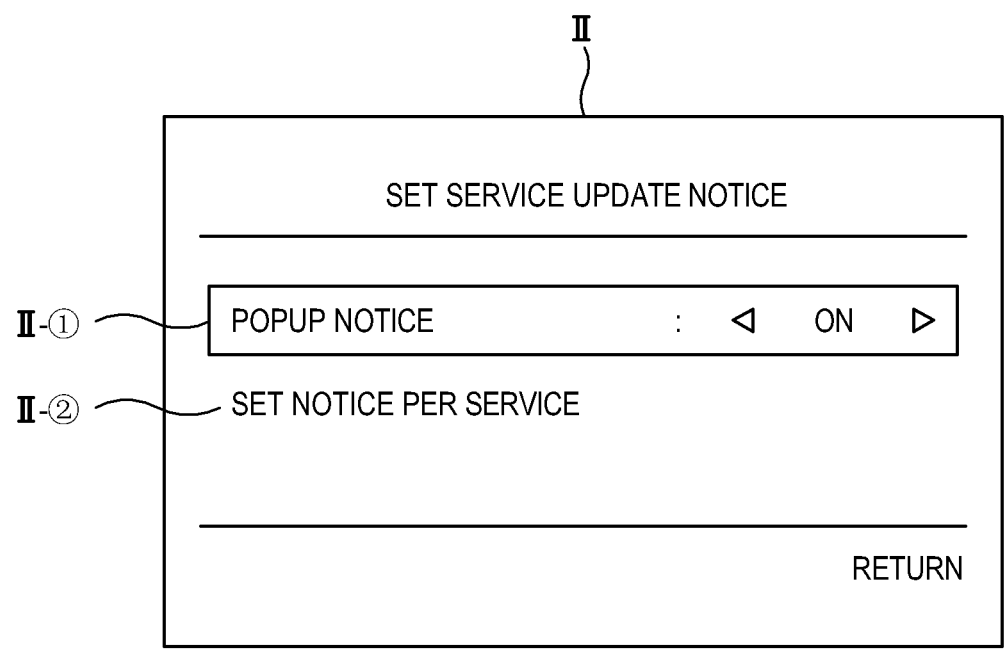
FIG. 5 illustrates a UI that is displayed on an image device to set a notice service according to an exemplary embodiment.
Figure 6:
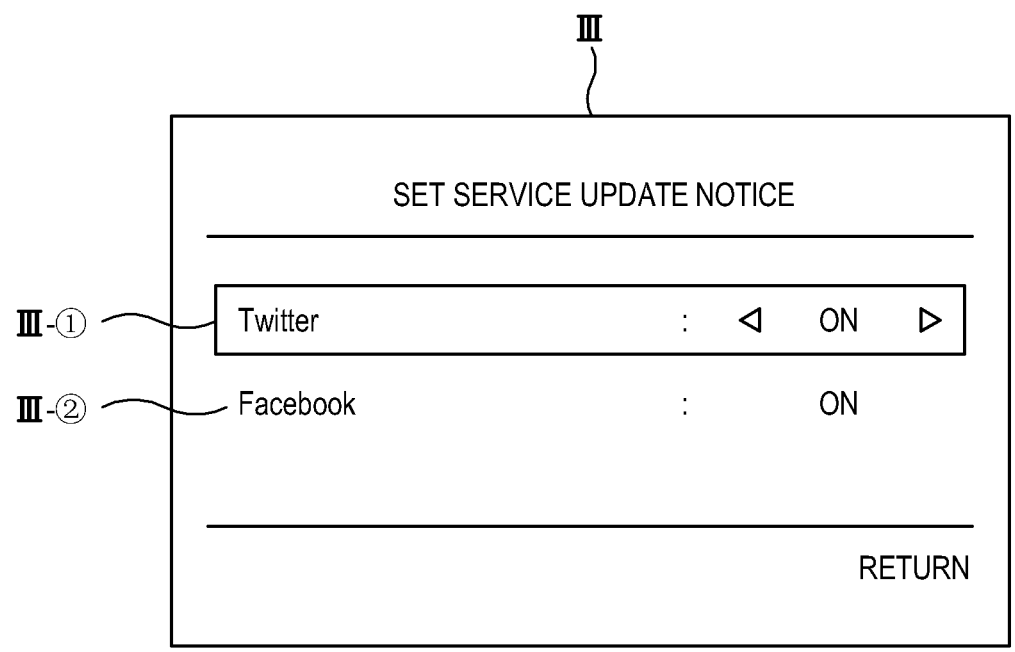
FIG. 6 illustrates a UI that is displayed on an image device to set a notice service according to another exemplary embodiment.

After a user's log-in, an application controller 140 determines whether a push service is active and whether there is an application that has a notice service active to display reception information of content (operation S20). According to the present exemplary embodiment, to use the push service, (i) the image device 100 includes at least one application executor, (ii) the push service is to be active, and (iii) an application executor that has the notice service active exists. A user may set the push service and the notice service as active through a UI, such as shown in FIGS. 4 through 6. FIG. 4 illustrates a UI that is displayed on an image device 100 to set a push service according to an exemplary embodiment. FIG. 5 illustrates a UI that is displayed on an image device 100 to set a notice service according to an exemplary embodiment. FIG. 6 illustrates a UI that is displayed on an image device 100 to set a push service per content provider 300 according to another exemplary embodiment.

FIG. 4 illustrates a first menu window I for setting an environment of the image device 100. A "system settings" item includes a subitem I-① to select "set service update notice." The "service" refers to a service of providing content by a content provider 300. A user may determine whether to set the push service as active or inactive by turning on or off the subitem I-①. Furthermore, the push service may be individually set per application.

If the push service is set as active in FIG. 4, a user may set a displaying state of the notice service through a second menu window II relating to "set service update notice" in FIG. 5. The second menu window II includes a "popup notice" subitem II-① and a "set notice per service" subitem II-② . If the "popup notice" subitem II-① is selected, reception information informing the reception of content is displayed as a popup on the display unit 120 upon reception of the content from the server 200. Accordingly, a user may recognize the reception of a new content without difficulty. If a user does not desire to receive the popup notice, the user may set the notice service as inactive while receiving content from the content provider 300.

If the "set notice per service" subitem II-② in FIG. 5 is selected, a third menu window III may be displayed on the display unit 120 to set the notice service per content provider 300 as in FIG. 6. For example, the third menu window III includes a "TWITTER" subitem III-① and a "FACE-BOOK" subitem III-② as representative SNS. A user may individually set the notice service as active or inactive per content provider 300. The second menu window II and the third menu window III include a return item to return to a previous menu window.

According to another exemplary embodiment, instead of individually setting the push service and notice service as active or inactive, if the notice service is set as active or inactive, the push service may be automatically set as active or inactive according to the setting of the notice service. In this case, the notice service is provided with the assumption that the push service is set as active, and a user may set the push service merely by selecting the notice service.

Referring back to FIG. 3, if it is determined that the above three conditions are met, the application controller 140 attempts to connect to the server 200 (operation S30), and the server 200 conducts an authentication process of the image device 100 that attempts to connect to the server 200 (operation S40). The server 200 responds to the attempt by the image device 100. The image device 100 transmits to the server 200 information of the image device 100, such as at least one of an image device ID, a type of the image device 100, a model ID, a country code and certification information of the image device 100, a request for an authentication, etc.

If the authentication process is completed, the application controller 140 determines whether there is any valid token in the image device 100 (operation S50). The token refers to an identifier that enables a user connected to the image device 100 to receive content relating to the user, i.e. content that belongs to the user, from the content provider 300. That is, the token matches a user ID to identify a user in the image device 100 to a content ID used by a user to be connected to the content provider 300. The content provider 300 and the server 200 identify a particular user as a token, and transmit and receive contents according to such a token. For example, it is assumed that a user connected to the image device 100 is a father, the father's user ID is "Father" and the father's content ID to the content provider 300 is "Bob." Corresponding to the foregoing, an identifier "01*25" may be set as a token. Upon a generation of new content for Bob, the content provider 300 may transmit the new content to the server 200 together with the token "01*25," and the server 200 may transmit to a user content corresponding to the token "01*25".

If it is determined that the valid token exists, the application controller 140 performs a service log-in to the content provider 300, and transmits the token to the server 200 (operation S60).

The server 200 performs the authentication process to determine whether the received token is valid (operation S70).

If the image device 100 is connected to the server 200 through the above process, the image device 100 transmits to the server 200 a keep-alive message to maintain the connection to the server 200 or a ping message (operation S80).

Figure 7:
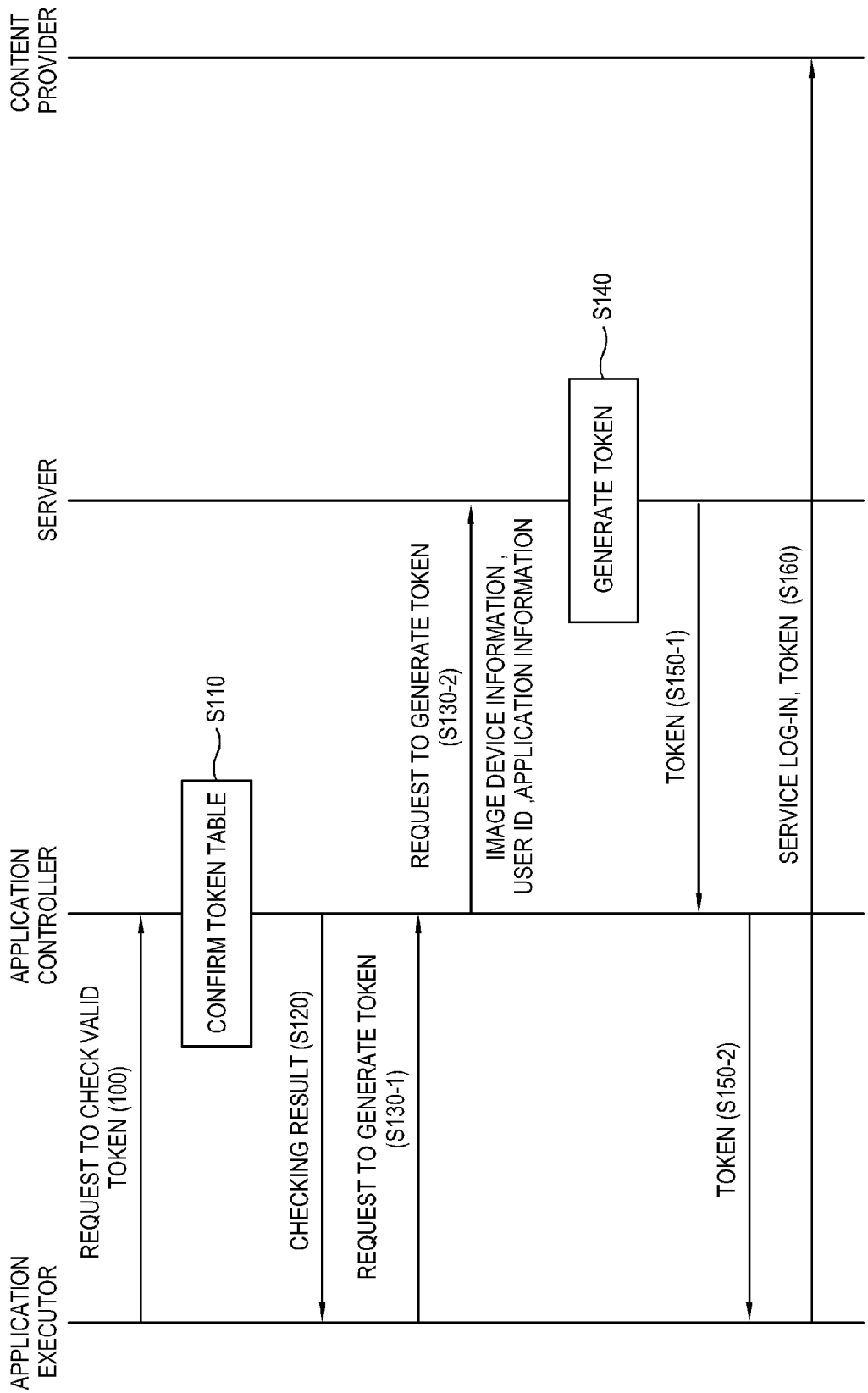
FIG. 7 is a control flowchart of a process of generating a token of an image device and a server according to an exemplary embodiment.

FIG. 7 is a control flowchart of a process of generating a token of an image device 100 and a server 200 according to an exemplary embodiment. For example, the process of FIG. 7 may correspond to the operation of checking the valid token by the application controller 140 in FIG. 3 (operation S50).

Referring to FIG. 7, if a user selects to execute an application, or after the image device 100 is booted, an application executor 130 requests an application controller 140 to check whether a valid token exists (operation S100).

The application controller 140 determines whether the valid token exists with respect to a log-in user through a stored token table (operation S110), and notifies the application executor 130 of the checking result (operation S120).

If the valid token exists, the application controller 140 transmits the token to the server 200, such as in operation S60 of FIG. 3, requests the token authentication process, and logs in to a content provider 300.

If it is determined that the token does not exist with respect to the log-in user, the application executor 130 requests the application controller 140 to generate a token (operation S130-1), and the application controller 140 then requests the server 200 to generate the token (operation S130-2). For example, the application controller 140 transmits to the server 200 at least one of image device information, a user ID, and application information. The application information refers to information to identify the content provider 300 such as information to identify TWITTER or FACEBOOK.

The server 200 stores the received information as a table in the storage unit 230, and generates the token to connect the content ID corresponding to a log-in user (operation S140).

The generated token is transmitted to the application executor 130 through the application controller 140 (operations S150-1 and S150-2).

The application controller 140 may also store the new token as a table for each user, and controls the application executor 130 to transmit the token to the content provider 300.

The application executor 130 transmits the token to the content provider 300 and performs the service log-in to the content provider 300 (operation S160). If a user sets the push service as active and the token is generated with respect to the particular content provider 300, a user does not need to log in to the content provider 300, and the service log-in is automatically performed by the application controller 140.

Figure 8:
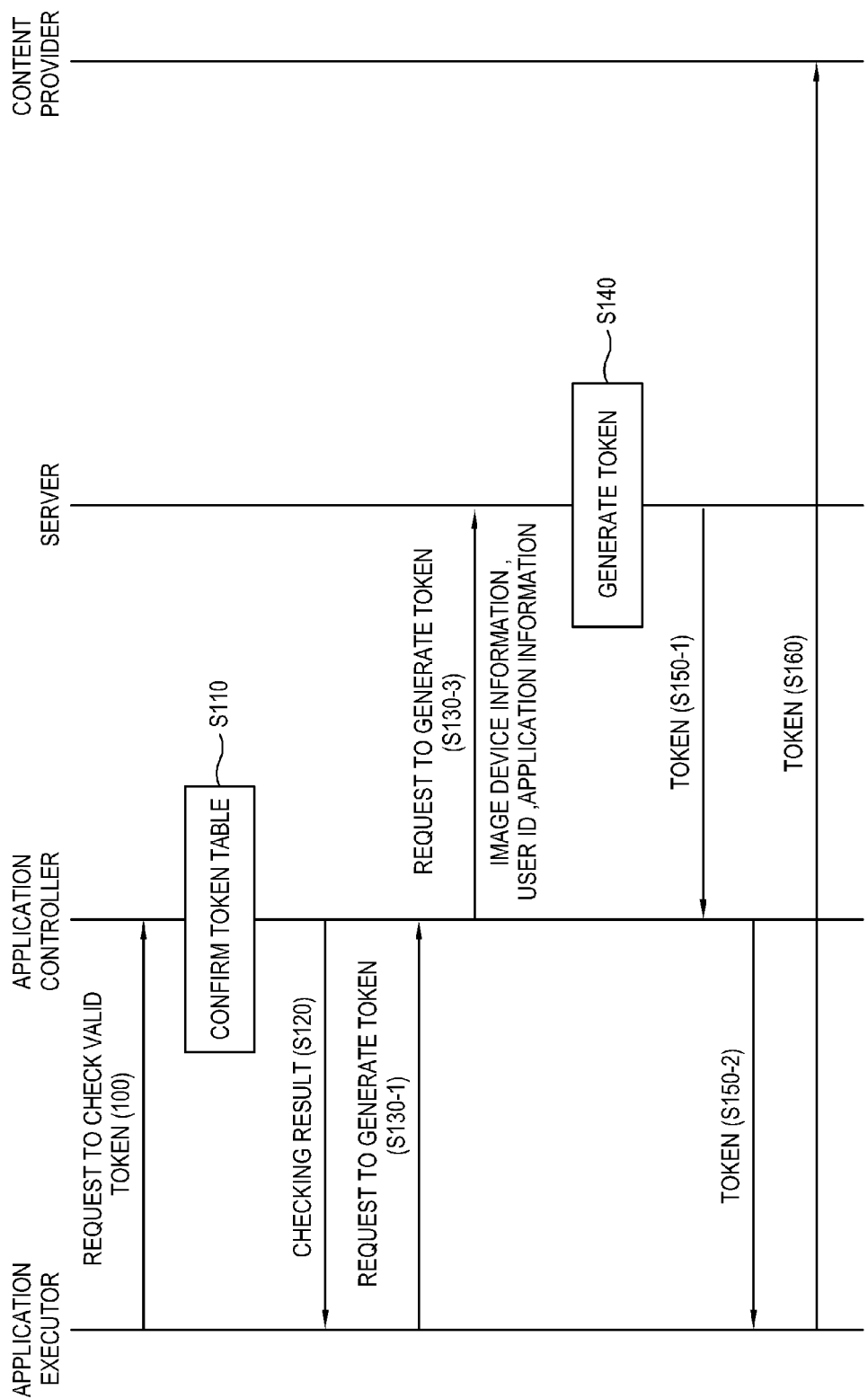
FIG. 8 is a control flowchart of a process of generating a token of an image device and a server according to another exemplary embodiment.

FIG. 8 is a control flowchart of a process of generating a token by an image device 100 and a server 200 according to another exemplary embodiment. Referring to FIG. 8, if content is not user-dependent or not user-binding, e.g., if content includes information such as news or advertisements that does not target a particular person, the application controller 140 transmits to the server a common user ID indicating a common user rather than a user ID logging in the image device 100 when an application controller 140 requests the token from the server 200 (operation S130-3). For example, the common user ID may be set as "all," indicating all users.

Upon receiving the token corresponding to the common user ID (operation S150-2), the application executor 130 transmits the token to a content provider 300 (operation S160). As content with respect to a particular user is not needed, a user not need to log in to the content provider 300.

The content provider 300 that receives the token may provide content, together with the token, to the image device 100 through the server 200 upon generation of the content.

Figure 9:
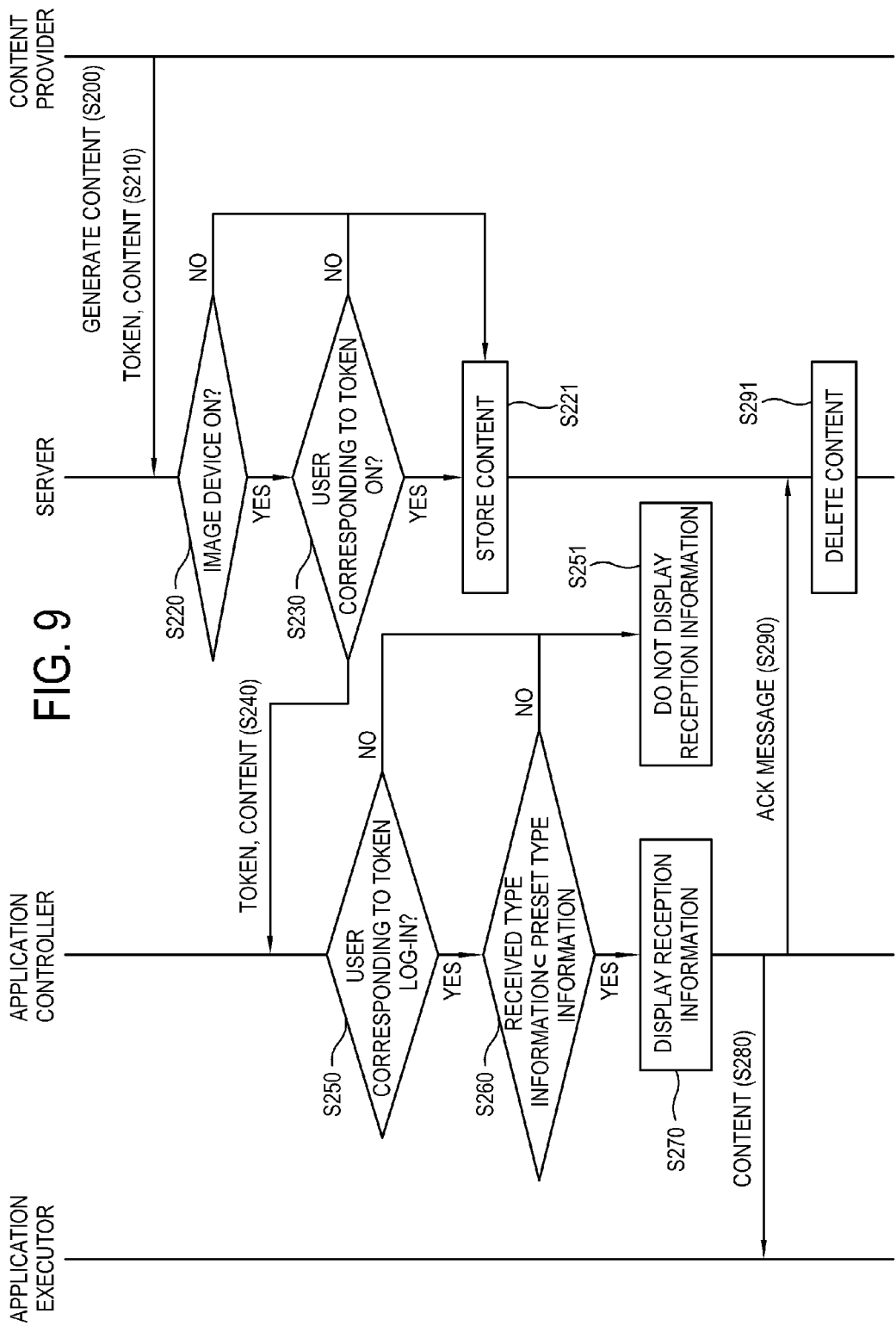
FIG. 9 is a control flowchart of a process of receiving content and displaying reception information by an image device and a server according to an exemplary embodiment.

FIG. 9 is a control flowchart of a process of receiving content and displaying reception information by an image device 100 and a server 200 according to an exemplary embodiment.

Referring to FIG. 9, if new content is generated or content such as a friend request or a dialog request is generated from an SNS site (operation S200), a content provider 300 transmits to the server 200 the new content together with the token (operation S210).

The server 200 determines the status of the image device 100, e.g., whether the image device 100 is turned on, corresponding to the transmitted token (operation S220).

If the image device 100 is turned on, the server 200 determines whether the current image device 100 is logged-in to by a user corresponding to the received token (operation S230).

If it is determined that the received content relates to a current log-in user, the server 200 transmits to an application controller 140 of the image device 100 the content together with the token (operation S240).

If the image device 100 is turned off, or a log-in user of the image device 100 does not correspond to the received token, the server 200 may store in a storage unit 230 the received content instead of transmitting the received content to the image device 100 (operation S221). In this case, the server 200 may store in the storage unit 230 all of received contents or only the latest received content. Moreover, a user may set a quantity or a type of the stored contents through the image device 100.

Upon receiving the token and the content, the application controller 140 may again check a logged-in user, such as the server 200 has done. For example, the moment a log-in user of the image device 100 is changed from A to B, the content of A may be transmitted to the image device 100. As the transmitted content does not relate to B, the content is not be transmitted to B. To reduce errors due to such transmission, the application controller 140 determines whether the current image device 100 is logged-in to by a user corresponding to the received token (operation S250).

If it is determined that a user corresponding to the token corresponds to a log-in user of the image device 100, the application controller 140 confirms type information on displaying the reception information by checking a payload of the content and determines whether the received type information is included in preset type information (operation S260). A user may set the type information of the reception information at a time of generating a token, and the reception information may be designated as a particular type per content.

If it is determined that the received type information is included in the preset type information or is within an acceptable scope, the application controller 140 displays on a display unit 120 reception information to inform the reception of the content (operation S270). The reception information may be displayed as at least one of a text, an icon, a badge, etc., displaying the number of received contents. FIGS. 10 to 13 illustrate reception information displayed on the image device 100 according to one or more exemplary embodiments.

According to another exemplary embodiment, the reception information of the content may be displayed on an external device (not shown) that is connected to the image device 100. The external device may include a remote controller or a terminal that has a user interface to control the image device 100. As a dual television system has been realized, a sub television may be used to control an image displayed on the image device 100. Thus, the reception information may be displayed on such a sub television. In this case, the reception information may be transmitted to the external device by the image device 100, or the server 200 may directly transmit the reception information to the external device according to a user identification.

According to another exemplary embodiment, display of the reception information may be controlled by the server 200 instead of by the application controller 140 of the image device 100.

Figure 10:
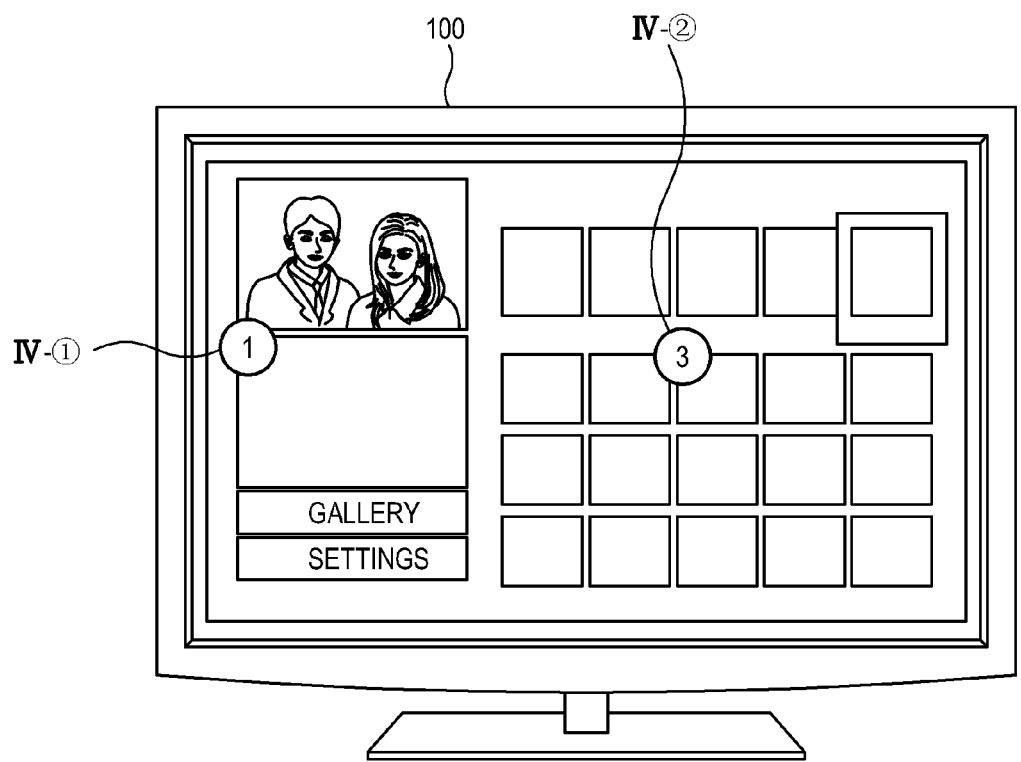
FIG. 10 illustrates reception information that is displayed on an image device according to an exemplary embodiment.

FIG. 10 illustrates reception information that is displayed by an application browser displaying all of application executors 130 executing contents. Referring to FIG. 10, the reception information may be displayed as numbers (IV-①) and IV-②) indicating the number of received contents as described above. ① may indicate a new Video On Demand (VOD) content, and ② in an icon of a particular application may indicate three new articles posted for the particular application.

Figure 11:
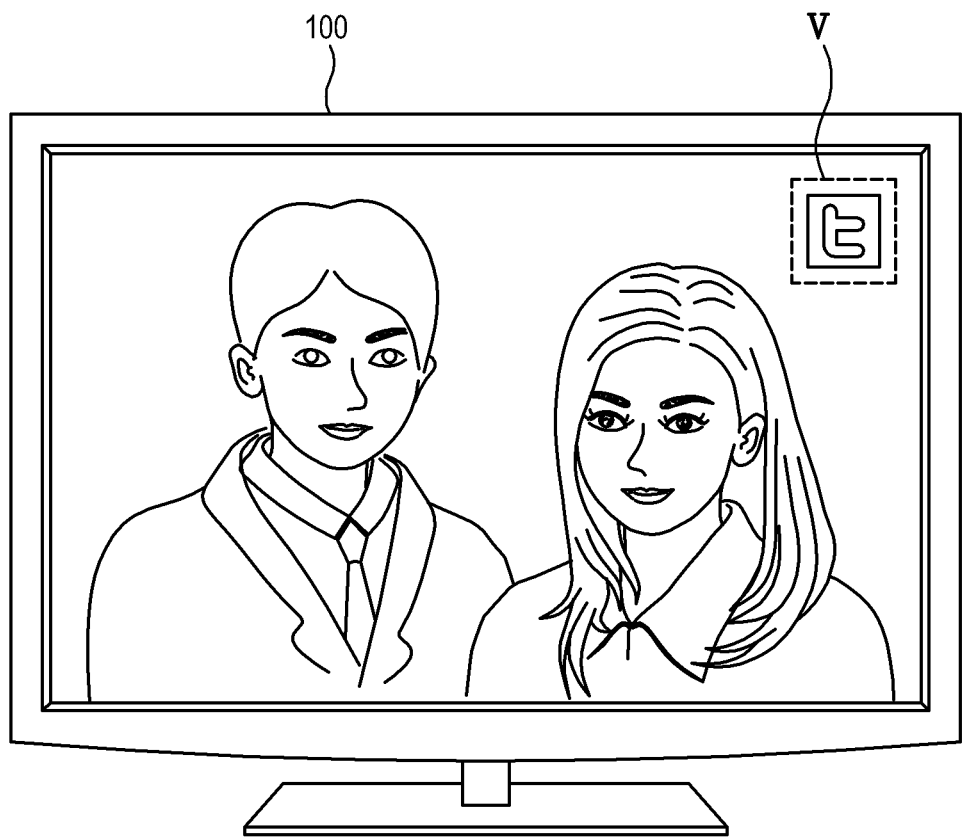
FIG. 11 illustrates reception information that is displayed on an image device according to another exemplary embodiment.

FIG. 11 illustrates an image V which is a symbol of a particular content provider 300 and is displayed as a popup on a part of the display unit 120 so as not to disturb a user when content is generated while the user views broadcasting information or reproduced image content. The generated image V may disappear after being displayed for a predetermined period of time, may be displayed continuously for a user to recognize, may flicker, etc.

Figure 12:
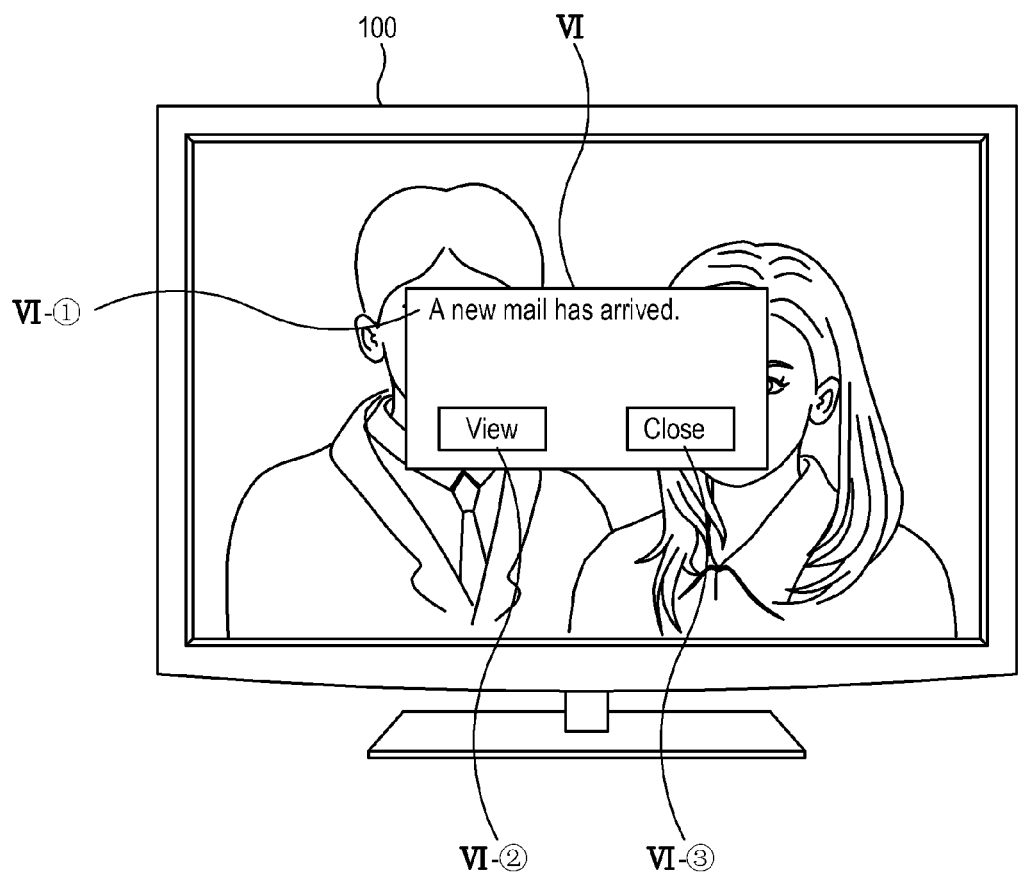
FIG. 12 illustrates reception information that is displayed on an image device according to another exemplary embodiment.

FIG. 12 illustrates an example of reception information that is displayed as a text. Referring to FIG. 12, the text type reception information VI may be displayed in a center or a side of the display unit 120 while an application browser is executed or an image is displayed. The reception information may include a preset text VI-①, such as "A new mail has arrived," a "view" item VI-②, and a "close" item VI-③ to select an execution or a non-execution of the content. The displayed text may be set in advance by the type of the content or per content provider 300. If a user selects the "view" item VI-②, the content is displayed. If a user selects the "close" item VI-③, the reception information VI disappears.

Figure 13:
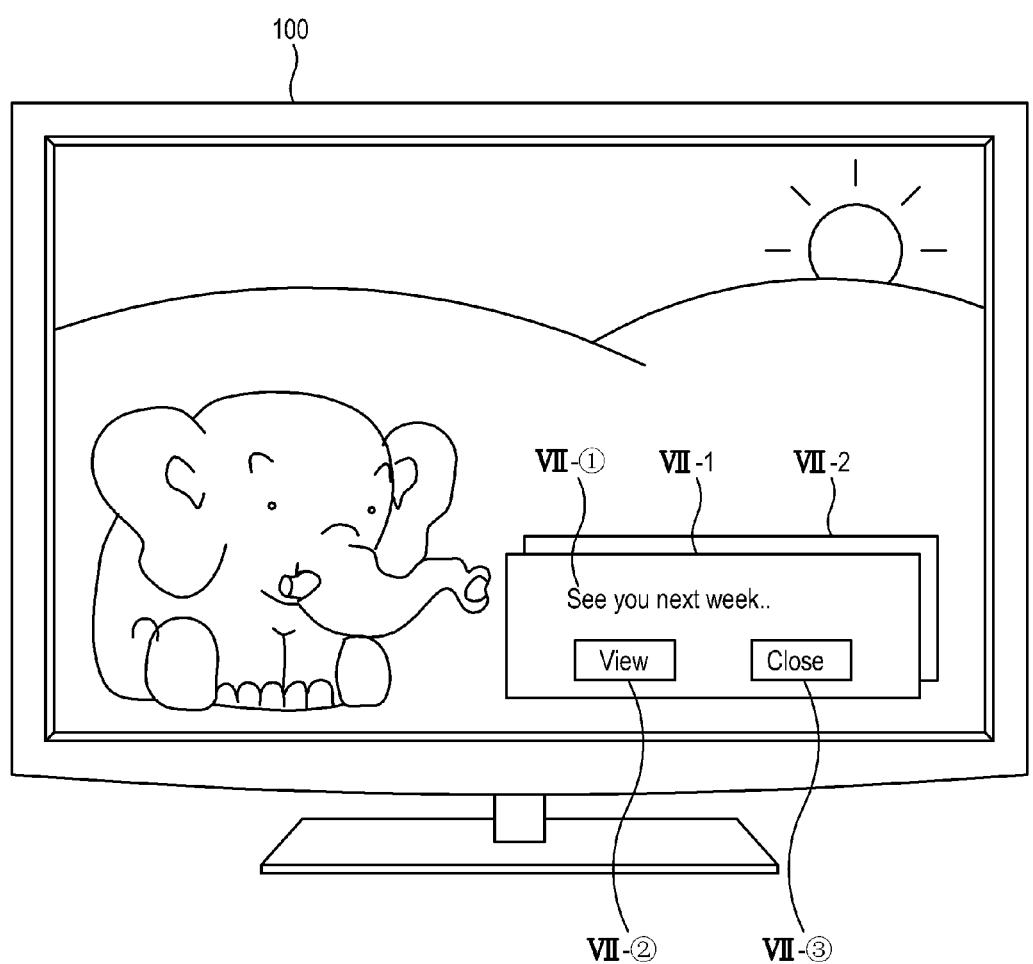
FIG. 13 illustrates reception information that is displayed on an image device according to another exemplary embodiment.

Referring to FIG. 13, reception information VII-1 and VII-2 includes a portion of transmitted content VII-① instead of a preset text. If the image device 100 receives content from two content providers 300, the reception information VII-1 and VII-2 may be displayed as two layers. The reception information VII-1 of the latest content includes a text such as "See you next week." A user may directly confirm a part of the transmitted content. The reception information VII-1 may include a "view" item VII-② and a "close" item VII-③, such as in FIG. 12.

The reception information may be output as an audio instead of a GUI, or an audio together with the GUI.

Returning back to FIG. 9, if a user views reception information and selects an execution of content as in FIGS. 10 through 13, the application controller 140 transmits the content to an application executor 130 and controls the application executor 130 to execute the content (operation S280).

The application controller 140 transmits to the server 200 an acknowledge message informing that the content has been normally received (operation S290).

Upon receiving the acknowledge message, the server 200 deletes the stored content (operation S291).

If it is determined that the type information of the reception information does not belong to the preset type information, e.g., if a notice service of the application is changed from active to inactive, the application controller 140 does not display the reception information (operation S251), and does not transmit any signal to the server 200.

FIG. 14 is a control flowchart of a process of receiving content and displaying reception information by an image device 100 and a server 200 according to another exemplary embodiment. In particular, FIG. 14 illustrates a process of receiving content when the content is not user-bound.

Referring to FIG. 14, upon a generation of content (operation S200), a content provider 300 transmits to the application controller 140 the content together with a token corresponding to a common user (operation S210).

The server 200 determines whether the image device 100 is turned on (operation S220). If the image device 100 is turned on, the server 200 transmits the token and the content to an application controller 140 (operation S240). If the image device 100 is turned off, the server 200 may store the content (operation S221).

The application controller 140 determines whether type information of reception information included in the received content belongs to a scope of preset type information (operation S260). If the received type information does not belong to the preset type information, the application controller 140 does not display the reception information (operation S261).

If the received type information belongs to the preset type information or is within the acceptable scope, the application controller 140 displays the reception of the content (operation S270).

A process of transmitting the content to an application executor 130 (operation S280), a process of transmitting the acknowledge message to the server 200 (operation S290), and a process of deleting the content (operation S291) are substantially similar to those described with reference to FIG. 9.

According to another exemplary embodiment, upon a generation of a content, the server 200 may notify the image device 100 of the existence of the content, and may transmit the content to the image device 100 only when a user selects to receive the content.

That is, upon an occurrence of an event of generating a new content in the content provider 300, the server 200 may determine whether the image device 100 of a user who receives content is connected. If it is determined that the image device 100 is connected, a controller 240 controls a device communication unit 210 to transmit the content to the image device 100. The image device 100 displays thereon the reception information to notify a user of the content reception information.

FIG. 15 is a control flowchart of a process of managing a token by an image device 100 and a server 200 according to an exemplary embodiment.

Referring to FIG. 15, if a user deletes the application, or a user, i.e., a user ID, is deleted (operation S300), an application controller 140 determines that the token has been deleted, and transmits a content blocking message to the server 200 to suspend a push service (operation S310). Upon receiving a token and content from the server 200, the application controller 140 determines whether the transmitted token is a valid token. Since the application or the user is deleted as described above, the token is deleted accordingly. Thus, the token would be determined to be invalid, and the application controller 140 transmits the content blocking message to the server 200.

Upon receiving the content blocking message, the server 200 deletes the token and the corresponding user information (operation S320), and transmits to a content provider 300 an invalidity notice message to inform the invalidity of the deleted token (operation S330).

The content provider 300 also deletes the information of the invalid token (operation S340).

If a user is changed, the push service is changed from active to inactive, or an event of changing a notice service active occurs (operation S400), the application controller 140 transmits to the server 200 a message informing the occurrence of the event (operation S410).

The server 200 updates the token and the information corresponding to the occurred event. For example, if a log-in user is changed, the server 200 may change a current user ID that can receive content, and update type information of reception information corresponding to the changed user. The server 200 filters the received content, and transmits the content relating to the changed user to the image device 100. Furthermore, the server 200 changes the state of the image device 100 from an ON state to an OFF state upon receiving a disconnection message from the image device 100.

The server 200 may transmit the updated information to the content provider 300 (operation S430). The content provider 300 also updates information used to transmit the content. For example, if a user changes the push service to inactive, the server 200 transmits the event message to the content provider 300, and the content provider 300 does not transmit the content relating to the particular token to the server 200.

According to another exemplary embodiment, the server 200 may transmit to the content provider 300 a suspension message to suspend the transmission of the content if the service of the content provider 300 is not consistent with a policy of the server 200.

The content provider 300 may check whether a latest firmware has been installed in the image device 100, and provide a notice content to the image device 100 that does not have the latest firmware installed therein. Moreover, the server 200 may determine whether the firmware installed in the image device 100 is the latest firmware, and transmit the notice content to the image device 100 that does not have the latest firmware installed therein when the content provider 300 transmits the latest firmware. Upon receiving the notice content, the image device 100 may receive the latest firmware and update the firmware accordingly.

The content provider 300 may provide information of an updated application or a new application, if any, other than firmware. The image device 100 may confirm the information transmitted by the content provider 300 and the server 200, and may update or download the application if desired.

The content provider 300 may selectively provide content to a particular image device 100 instead of all of image devices 100 based on information received from the server 200 or the image device 100. For example, the content provider 300 may provide information of performances or events that can be viewed or attended only in a particular area based on information of the area where the image device 100 is installed. The content provider 300 may recommend content or an application corresponding to a user's preferences or provide channel information for programs in real-time based on information of a viewing list of a user or information of a frequently used application. If a user accepts the recommended information, the application may be downloaded or executed automatically or a channel may be changed automatically.

The content provider 300 may transmit all of performance and event information to the server 200, and the server 200 may select the content corresponding to the image device 100 and provide such content to the image device 100 individually or partially.

A user may control the image device 100 through the content provider 300 or the server 200 in the circumstance where the user may not control the image device 100 directly. For example, a user may be connected to the content provider 300 or the server 200 through the Web, and set a command signal to control a turning on/off of the image device 100 or fixing channels. The user may control the image device 100 to be turned off after particular time, or not to receive a broadcasting signal from a particular channel. In this case, the server 200 may control the image device 100 according to a command signal set by the user.

FIG. 16 is a control flowchart of a method of transmitting common content by an image device 100 and a server 200 according to an exemplary embodiment.

Referring to FIG. 16, a content provider 300 may generate content that is not bound to a user, e.g., at least one of a guide to firmware or an application, a notice message, various notice messages to be transmitted to many and unspecified persons, and common content to be transmitted to a plurality of image devices 100 (operation S201). For example, the common content is transmitted not to a particular user, but to all users. In this case, a number of same contents are transmitted from the content provider 300 to the server 200, and from the server 200 to the image device 100. This may cause an overload to data transmission.

To solve the foregoing problem, the server 200 according to the present exemplary embodiment receives only one of common content not bound to a user and common content to be transmitted to the plurality of image device 100 from the content provider 300, together with a token (operation S211). The server 200 may be set in advance to receive from the content provider 300 a single common content instead of plural common contents corresponding to the image device 100 that may receive the common content.

Upon receiving the common content, a controller 240 of the server 200 generates a plurality of common contents per image device 100 (operation S212).

The controller 240 transmits, on a time-sharing basis, the common content to the plurality of image devices 100 according to a particular condition. As shown in FIG. 16, the controller 240 may transmit the common content depending on whether the image device 100 is turned on or off.

In this exemplary case, the controller 240 determines whether the image device 100 is turned on (operation S220). If it is determined that the image device 100 is turned on, the controller 240 transmits the common content (operation S241).

If the image device 100 is determined to be turned off, the controller 240 stores the common content (operation S222), and transmits the common content to the image device 100 upon turning-on of the image device 100. That is, the controller 240 according to the present exemplary embodiment transmits the common content to the turned-on image device 100 ahead of the turned-off image device 100. The controller 240 classifies the case when the image device 100 is turned off and a user cannot access the common content, and the case when a user can confirm the common content immediately, in transmitting data. This prevents an inconvenience to a user and prevents data overload.

A method of processing the content by the image device 100 which receives the common content is substantially similar to that of the exemplary embodiment described above.

FIG. 17 is a control flowchart of a method of transmitting common content by an image device 100 and a server 200 according to another exemplary embodiment.

Referring to FIG. 17, a controller 240 of the server transmits on a time-sharing basis the common content to a plurality of image devices 100 based on a standard time of the image devices 100 (operation S242).

The Web is not limited to a particular country or area, and the content provider 300 to which a user has access may be global. Thus, if the common content that is provided by the content provider 300 is transmitted to all users around the world at the same time, data overload may occur. The controller 240 may classify the image device 100 based on the world standard time of the area where the image device 100 is installed, and may sequentially transmit the common content. The controller 240 may first transmit the common content to an area where it daytime at the time when the common content is generated, and subsequently to an area where it is nighttime at the time when the common content is generated.

Furthermore, the controller 240 may transmit on a time-sharing basis the common content based on an order set for each continent, or may classify the image device 100 according to a user's characteristic and sequentially transmit the common content to the classified image device 100 according to the classification.

As described above, one or more exemplary embodiments provide a push service by which a particular user may receive a content relating to the user by using an individual log-in and a token in an environment where a plurality of users can access a single image device.

Also, one or more exemplary embodiments provide various methods of transmitting and receiving content between a content provider 300, a server 200 and an image device 100.

As described above, an image device, a receiving method of content, a server and a providing method of content according to exemplary embodiments provide a push service to multiple users.

While not restricted thereto, an exemplary embodiment can also be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an exemplary embodiment may be written as a computer program transmitted over a computer-readable transmission medium, such as a carrier wave, and received and implemented in general-use or special-purpose digital computers that execute the programs. Moreover, while not required, one or more units of the image device 100, the server 200, and the content provider 300 can include a processor or microprocessor executing a computer program stored in a computer-readable medium.

Although a few exemplary embodiments have been shown and described, it will be appreciated by those skilled in the art that changes may be made in these exemplary embodiments without departing from the principles and spirit of the inventive concept, the scope of which is defined in the appended claims and their equivalents.

What is claimed is:

1. An image device for performing a push service, the image device comprising: a communication unit which communicates with a server that provides content received from a content provider; a display unit; and a controller which determines whether identification information input by a user matches first identification information which enables the user to log in to the image device, determines whether the push service for receiving the content from the content provider is active in response to determining that the identification information matches the first identification information, and, in response to determining that the push service is active, controls the communication unit to transmit a request to the server to generate associating information for associating the first identification information with second identification information which enables the user to log in to the content provider, receives from the server the associating information which is generated in response to the request, controls the communication unit to transmit the associating information which is received from the server to the content provider, receives the content from the content provider based on the second identification information included in the associating information which is received from the server and controls the display unit to display reception information indicating reception of the content based on the first identification information, wherein, when the image device is turned on, the controller controls the communication unit to receive, before another image device that is turned off, at least one of first common content that is not user-bound and second common content to be transmitted to a plurality of image devices, and wherein the image device and the another image device are associated with the user.

2. The image device according to claim 1, wherein the controller determines whether an application in which a notice service is set as active to display the reception information of the content exists, and connects to the server if it is determined that the push service is set as active and the application in which the notice service is set as active exists.

3. The image device according to claim 1, wherein the controller determines whether a token corresponding to a log-in user exists after a user logs-in, and requests the server to generate the token if it is determined that the token does not exist.

4. The image device according to claim 3, wherein the controller transmits, to the server, image device information comprising at least one of an image device ID, a user ID, and application information when requesting the server to generate the token.

5. The image device according to claim 3, wherein the controller transmits, to the server, image device information comprising at least one of an image device ID, a common user ID that is common to a plurality of users, and application information when requesting the server to generate the token if an application corresponding to the token is not user-bound to the log-in user.

6. The image device according to claim 4, wherein the controller stores the token received from the server, and controls an application execution unit to transmit the token to the content provider.

7. The image device according to claim 1, wherein the controller determines whether a user corresponding to a token is a log-in user of the image device upon receiving the token and the content from the server, and displays the reception information if it is determined that the user corresponding to the token is the log-in user.

8. The image device according to claim 7, wherein the content comprises type information of a type of displaying the reception information, and the controller displays the reception information if the type information is determined to correspond to preset type information.

9. The image device according to claim 8, wherein the display unit displays the reception information as at least one of a text, an icon, and a number indicating a number of received contents.

10. The image device according to claim 7, wherein the controller controls an application execution unit to execute the content and transmits an acknowledge message informing the reception of the content to the server if it is determined that the user corresponding to the token is the log-in user and the log-in user selects the execution of the content corresponding to the displayed reception information.

11. The image device according to claim 1, wherein the controller determines whether a received token for the content, received from the server, corresponds to a stored token, and transmits a content blocking message to the server if it is determined that the received token does not correspond to the stored token.

12. The image device according to claim 2, wherein the controller transmits an event message to the server if a change of a log-in user, a change of the push service between active and inactive, a change of the notice service between active and inactive per application, a deletion of a token, or a deletion of the application occurs.

13. A server for performing a push service, the server comprising: a communication unit which communicates with an image device and a content provider providing content; and a controller which controls the communication unit to connect to the image device in response to the image device determining that identification information input by a user into the image device matches first identification information which enables the user to log in to the image device and that the push service for receiving the content from the content provider is active, and in response to connecting to the image device, generates associating information for associating the first identification information with second identification information which enables the user to log in to the content provider, controls the communication unit to transmit the generated associating information to the image device, and controls the communication unit to receive the content from the content provider based on the second identification information and controls the communication unit to transmit the received content to the image device based on the first identification information, wherein the controller controls the communication unit to transmit at least one of first common content that is not user-bound and second common content to be transmitted to a plurality of image devices, to a first image device, among the plurality of image devices, that is turned on before a second image device, among the plurality of image devices, that is turned off, and wherein the first image device and the second image device are associated with the user.

14. The server according to claim 13, wherein the communication unit receives, from the image device, image device information comprising an image device ID, a user ID of a current log-in user of the image device, and application information, and the controller determines whether a user corresponding to a received token is the current log-in user of the image device in response to receiving the token and content corresponding to the received token through a provider communication unit, and transmits the received token and the content to the image device if it is determined that the user corresponding to the token is the current log-in user, and stores the received content if it is determined that the user corresponding to the token is not the current log-in user.

15. The server according to claim 14, wherein the controller deletes the image device information, the user ID and the application information corresponding to the received token, and transmits, to the content provider, an invalidity notice message informing an invalidity of the received token in response to receiving a content blocking message from the image device.

16. The server according to claim 14, wherein the controller updates at least one of the image device information, the user ID and the application information and transmits the updated information to the content provider in response to receiving, from the image device, an event message indicating at least one of a change of a log-in user, a change of a push service receiving the content from the content provider, a change of a notice service displaying reception information of the content, a deletion of the token, and a deletion of an application.

17. A receiving method of receiving content by an image device which communicates with a server providing the content received from a content provider, the receiving method comprising: determining whether a token which matches a user ID corresponding to a log-in user of the image device to a content ID for the log-in user to be connected to the content provider exists; requesting the server to generate the token if it is determined that the token does not exist; receiving the token from the server in response to the request; transmitting the received token to the content provider; determining whether a push service for receiving the content from the content provider through the server is set as active; receiving content corresponding to the token from the content provider based on identification information included in associating information which is received from the server if it is determined that the token exists and the push service is active; and displaying reception information indicating reception of the content, wherein the method further comprises: when the image device is turned on, receiving, before another image device that is turned off, at least one of first common content that is not user-bound and second common content to be transmitted to a plurality of image devices, and wherein the image device and the another image device are associated with the log-in user.

18. The receiving method according to claim 17, further comprising:
 determining whether an application in which a notice service displaying reception information of the content exists; and
 connecting to the server if it is determined that the push service is set as active and the application in which the notice service is set as active exists.

19. The receiving method according to claim 17, wherein the requesting the server to generate the token comprises:
 transmitting, to the server, image device information comprising an image device ID, the user ID, and application information if a corresponding application is user-dependent; and
 transmitting, to the server, image device information comprising the image device ID, a common user ID, and application information if the application is not user-bound.

20. The receiving method according to claim 19, further comprising storing the token received from the server, and transmitting the token to the content provider.

21. The receiving method according to claim 17, further comprising displaying reception information of the received content.

22. The receiving method according to claim 21, wherein the displaying the reception information comprises:
 determining whether a user corresponding to a received token is a currently logged-in user to the image device if the token and the content are received from the server; and
 displaying the reception information if it is determined that the user corresponding to the token is the currently logged-in user.

23. The receiving method according to claim 22, wherein:
 the content comprises type information of a type of displaying the reception information; and
 the displaying the reception information comprises displaying the reception information if the type information is determined to correspond to preset type information.

24. The receiving method according to claim 21, further comprising executing the content and transmitting, to the server, an acknowledge message informing the reception of the content if execution of the content corresponding to the displayed reception information is selected.

25. The receiving method according to claim 17, wherein the determining comprises:
   determining whether a received token for the received content corresponds to a stored token; and
   transmitting a content blocking message to the server if it is determined that the received token does not correspond to the stored token.

26. The receiving method according to claim 18, further comprising transmitting an event message to the server if a change of the log-in user, a change of the push service between active and inactive, a change of the notice service between active and inactive, a deletion of the token, or a deletion of the application occurs.

27. A providing method of providing content by a server which communicates with an image device and a content provider providing the content, the providing method comprising: receiving a request to generate a token that matches a user ID, for a user to log in to the image device, to a content ID for the user ID of the user to be connected to the content provider; generating the token corresponding to the user and transmitting the generated token to the image device; determining whether a push service for receiving the content from the content provider through the server is set as active; receiving the content from the content provider based on identification information included in the token and in response to determining that the push service is active; and transmitting the received content to the image device, wherein the method further comprises: transmitting at least one of first common content that is not user-bound and second common content to be transmitted to a plurality of image devices, to a first image device, among the plurality of image devices, that is turned on before a second image device, among the plurality of image devices, that is turned off, and wherein the first image device and the second image device are associated with the user.

28. The providing method according to claim 27, further comprising:
   receiving, from the image device, image device information comprising an image device ID, a user ID of a user who is currently logged-in to the image device, and application information;
   receiving, from the content provider, a token and content corresponding to the token;
   determining whether a user corresponding to the received token is the currently logged-in user of the image device;
   transmitting the received token and the received content to the image device if it is determined that the user corresponding to the token is the currently logged-in user; and
   storing the received content if it is determined that the user corresponding to the token is not the currently logged-in user.

29. The providing method according to claim 28, further comprising:
   receiving a content blocking message from the image device;
   deleting the image device information, the user ID, and application information corresponding to the token in response to the receiving the content blocking message; and
   transmitting an invalidity notice message informing the invalidity of the received token to the content provider in response to the receiving the content blocking message.

30. The providing method according to claim 28, further comprising:
   receiving, from the image device, an event message indicating at least one of a change of a log-in user, a change of the push service receiving the content from the content provider, a change of a notice service displaying reception information of the content, a deletion of the token, and a deletion of an application; and
   updating at least one of the image device information, the user ID and the application information according to the received event message.

31. A server comprising:
   a device communication unit which communicates with a plurality of image devices; a provider communication unit which communicates with a content provider providing content; and a controller which determines whether an image device of a user, among the plurality of image devices, that receives the content of the content provider is currently connected in response to receiving new content from the content provider, determines whether a push service for receiving the content from the content provider is active, and controls the device communication unit to transmit the content to the image device if it is determined that the image device of the user who receives the content is connected and the push service is active, wherein the controller controls the device communication unit to transmit at least one of first common content that is not user-bound and second common content to be transmitted to a plurality of image devices, to a first image device, among the plurality of image devices, that is turned on before a second image device, among the plurality of image devices, that is turned off, and wherein the first image device and the second image device are associated with the user.

32. A providing method of providing content, the providing method comprising: receiving, by a server, new content from a content provider; determining whether an image device of a user who receives content from the content provider is connected to the server; determining whether a push service for receiving the content from the content provider is active; and transmitting, by the server, the new content to the image device if it is determined that the image device of the user who receives the content is connected to the server and the push service is active, wherein the method further comprises: transmitting at least one of first common content that is not user-bound and second common content to be transmitted to a plurality of image devices, to a first image device, among the plurality of image devices, that is turned on before a second image device, among the plurality of image devices, that is turned off, and wherein the first image device and the second image device are associated with the user.

33. The providing method according to claim 32, further comprising displaying reception information indicating reception of the content.

34. The providing method according to claim 33, wherein the reception information is displayed on at least one of the image device receiving the content and an external device connected to the image device.

35. The server according to claim 13, wherein: the provider communication unit receives, from the content provider, at least one of the first common content that is not user-bound and the second common content to be transmitted to a plurality of image devices; and
   the controller controls the device communication unit to transmit the at least one of the first common content and the second common content to the plurality of image devices on a time-sharing basis according to a particular condition.

36. The server according to claim 35, wherein the controller controls the device communication unit to transmit the at least one of the first common content and the second common content to the plurality of image devices on a time-sharing basis based on a standard time of the plurality of image devices.

37. The providing method according to claim 27, further comprising:
   receiving, from the content provider, at least one of the first common content that is not user-bound and the second common content to be transmitted to a plurality of image devices; and
   transmitting the at least one of the first common content and the second common content to the plurality of image devices on a time-sharing basis according to a particular condition.

38. The providing method according to claim 37, wherein the transmitting the at least one of the first common content and the second common content on the time-sharing basis comprises transmitting the at least one of the first common content and the second common content to a first image device that is turned on before a second image device that is turned off.

39. The providing method according to claim 38, wherein the transmitting the at least one of the first common content and the second common content on the time-sharing basis comprises transmitting the at least one of the first common content and the second common content to the plurality of image devices on the time-sharing basis based on a standard time of the plurality of image devices.

40. The image device according to claim 3, wherein the controller receives the content corresponding to a log-in user from the server and displays, on the display unit, reception information indicating reception of the content based on a user identifier (ID) for the log-in user to be logged in to the image device and a token which matches the user ID to a content ID for the log-in user to be connected to the content provider.

41. The image device according to claim 3, further comprising:
   an application execution unit which executes the content.

42. The server according to claim 13, wherein the controller generates a token corresponding to a user of the image device and controls the communication unit to transmit the generated token to the image device in response to receiving a request to generate the token to match a user ID for logging in to the image device by the user and a content ID for the user ID of the user to be connected to the content provider.

* * * * *